United States Patent [19]

Monkhorst et al.

[11] Patent Number: 5,575,609
[45] Date of Patent: Nov. 19, 1996

[54] DEVICE FOR TILTING, CARRYING AND TRANSPORTING A GRAND PIANO

[75] Inventors: Ronald E. J. Monkhorst, Stompwijkseweg 33, NL-2266 GD Leidschendam; Diemer J. Roodenburg, Amsterdam, both of Netherlands

[73] Assignee: Ronald Edward Jan Monkhorst, Leidschendam, Netherlands

[21] Appl. No.: 295,873

[22] PCT Filed: Mar. 6, 1992

[86] PCT No.: PCT/NL92/00044

§ 371 Date: Dec. 13, 1994

§ 102(e) Date: Dec. 13, 1994

[87] PCT Pub. No.: WO93/17900

PCT Pub. Date: Sep. 16, 1993

[51] Int. Cl.⁶ ........................................ B60P 1/34
[52] U.S. Cl. ..................... 414/743; 187/233; 414/470; 414/917
[58] Field of Search ............................ 187/231, 233; 414/917, 684, 743, 470, 458, 495

[56] References Cited

U.S. PATENT DOCUMENTS 4,122,958  10/1978  Thayer ........................... 414/546
4,491,334  1/1985   Tarbell .......................... 414/778
4,913,614  4/1990   O'Rarden ....................... 414/460
5,387,074  2/1995   Brown ........................... 414/589

FOREIGN PATENT DOCUMENTS 1070358  12/1959  Germany.
2323568  11/1974  Germany.

Primary Examiner—Karen B. Merritt
Assistant Examiner—Gregory A. Morse
Attorney, Agent, or Firm—Young & Thompson

[57] ABSTRACT

A device for tilting, carrying and transporting a grand piano (2) comprises a wheeled frame (3, 4) designed to run underneath the grand piano. Elements for gripping (5), lifting (14) and tilting (17) the grand piano are fitted on the frame. The gripping elements (5) are made U-shaped to grip at least the bottom face (6), an adjacent end (7) face and the top face (8) of the grand piano. The gripping elements (5) are provided with wheels (11) and are detachably connected to the lifting and tilting devices. After lifting and then turning the piano through 90° and the like, the piano can be moved independently with the gripping elements by detaching the lifting and tilting devices. The gripping elements can form part of a case for protecting against damage during further transportation.

5 Claims, 4 Drawing Sheets

DEVICE FOR TILTING, CARRYING AND TRANSPORTING A GRAND PIANO

FIELD OF THE INVENTION

The present invention relates to a device for tilting, carrying and transporting a grand piano comprising a frame provided with wheels on which are fitted elements for gripping, lifting and tilting the grand piano.

BACKGROUND OF THE INVENTION

Such a device is known from U.S. Pat. No. 4,913,614. In this case the wheeled frame is moved under the grand piano. The L-shaped gripping elements are placed under the bottom face of the grand piano and the adjacent end face. By means of two lifting and tilting devices fitted laterally at the ends of the frame, the grand piano is first raised and then tilted to almost 90°. In this tilted position an auxiliary vehicle is manoeuvred against the frame, so that the grand piano can be transferred from the gripping elements to the auxiliary vehicle. Apart from the fact that this is a very complex construction, it is not ensured that the grand piano will be moved without damage, or it is necessary to carry out the fixing of the grand piano a number of times. During the transfer of the grand piano from the gripping elements to the auxiliary vehicle there is a great risk of damage from an uncontrolled tilting movement of the grand piano, which weighs up to 500 kg. This can be avoided by first fastening the grand piano to the gripping elements with the aid of holding straps or the like, and then fastening the grand piano to the auxiliary vehicle with the aid of holding straps, and removing the holding straps from the gripping elements. It is clear that this is very laborious. Besides, there is in each case the problem that the end face of the grand piano is not protected. This problem could be eliminated by extending the gripping elements, but it is not possible to protect the top face of the grand piano adjacent thereto, so that damage could occur relatively simply to this part on the underside during transportation.

SUMMARY OF THE INVENTION

The object of the present invention is to provide a device which does not have the above-mentioned disadvantages, i.e. is cheap to produce and simple to handle, and with it damage is guaranteed to be prevented.

This object is achieved with a device of the type described above and including U-shaped gripping elements so as to grip a part of the top side of the grand piano. The gripping elements are detachably connected to the lifting and tilting devices, and are provided with wheels.

The invention is based on the idea of connecting the gripping elements in a detachable manner to the lifting and tilting devices. The result is that the step of transferring the gripping elements to the auxiliary vehicle, as known from U.S. Patent Specification 4,913,614, is unnecessary. Such a design can be achieved only by fitting detaching devices and wheels on the gripping elements. Through this idea it is also possible to produce the gripping elements in such an optimum manner that the grand piano is positioned particularly well and is protected against damage during transportation. This can be achieved by making the gripping elements U-shaped. For, it is no longer necessary to move the grand piano over the body of the U-shape, as was the case in the state of the art.

According to an advantageous embodiment of the invention, the gripping elements form part of a container for transportation of the grand piano. For this purpose, these gripping elements are provided with fastenings. It is possible for the gripping elements to be accommodated in a container but, in view of their sturdy design, it is more effective if they form part of the external construction of such a container.

According to a further advantageous embodiment, the devices for lifting and tilting comprise a single lifting/tilting element fitted in the centre of the frame. Problems relating to synchronisation of two opposite-lying lifting and tilting elements are avoided in this way. All this is made possible through the particularly stable fixing of the grand piano in the U-shaped gripping elements.

According to a special embodiment of the above, the lifting/tilting element comprises a parallelogram arm construction which is hingedly fixed at one end to the frame, while lifting elements are fitted between the frame and the construction, and hingedly fixed at the other end to the plate to which a coupling part is hingedly fixed, while tilting devices engage on the coupling part at one side and on the plate or the parallelogram arm construction, at the other side. Lifting and then tilting of the grand piano can be achieved accurately with the aid of two independently operating lifting elements and tilting devices.

BRIEF DESCRIPTION OF THE DRAWINGS

The invention will be explained in greater detail below with reference to an example of an embodiment shown in the drawing, in which.

DETAILED DESCRIPTION OF THE INVENTION

Figure 1:
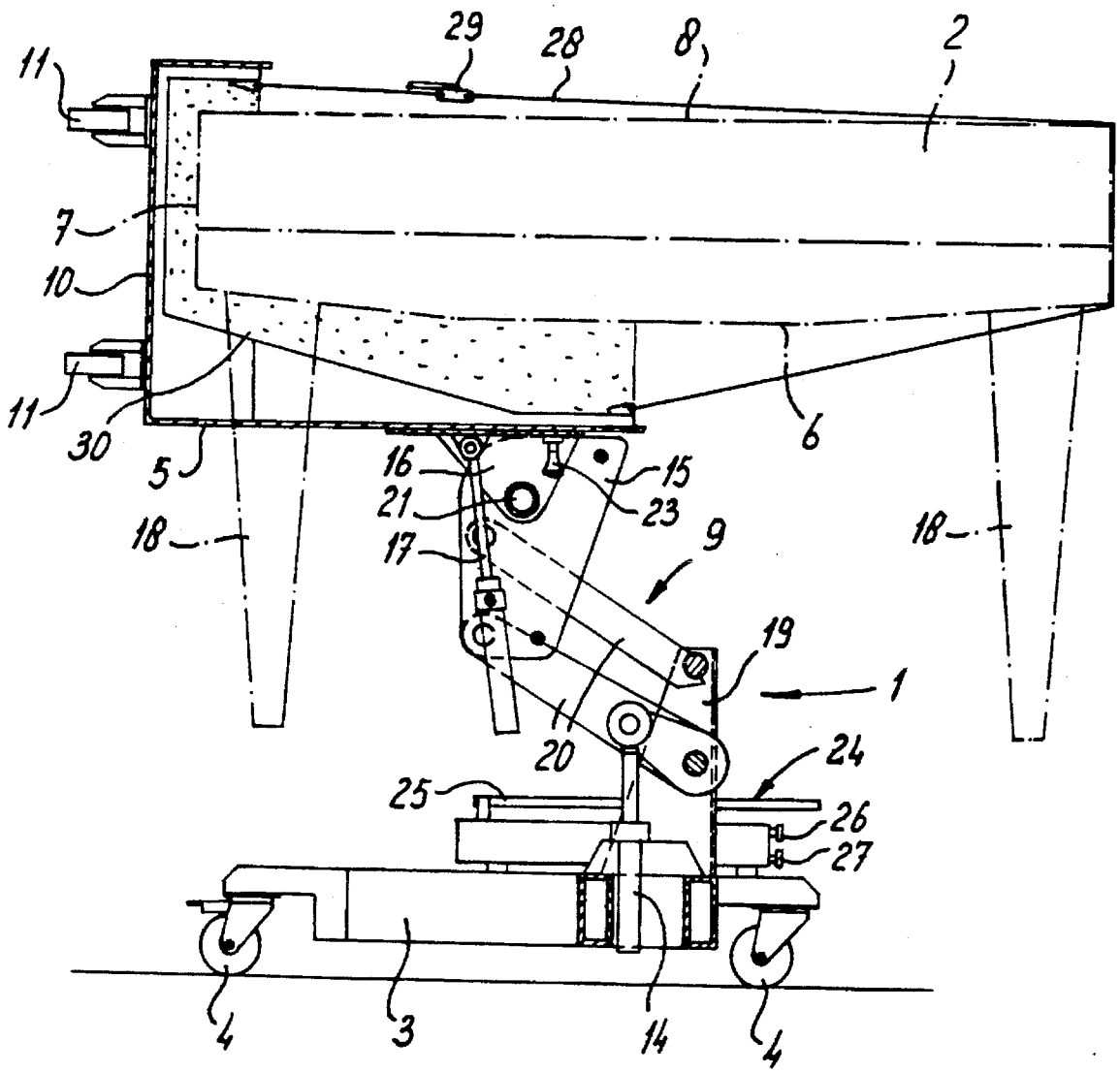
FIG. 1 shows in side view the device according to the invention placed under a grand piano raised from the floor.

The device according to the invention is indicated in its entirety by 1. This device is used to tilt, carry and transport a grand piano indicated by 2. This grand piano has a bottom face 6, a front face 7 adjacent thereto, and a top face 8. The legs are indicated by 18.

The device 1 according to the invention comprises a frame 3 provided with wheels 4. A lifting/tilting unit 9 is fitted on the frame 3. This unit 9 comprises a parallelogram arm construction which consists of an upright 19 to which arms 20 are hingedly fixed, which arms engage with their other ends on a plate 15. Plate 15 can be moved up and down in a fixed position by means of a lifting element 14. Plate 15 is provided with a hinge point 21 at which place coupling part 16 is rotatably fixed. A locking device 23 is fitted between coupling part 16 and gripping elements 5. Tilting devices 17 work between plate 15 and coupling part 16, so that the position of coupling part 16 can be set accurately relative to plate 15. Coupling part 16 is detachably fixed to gripping elements 5. Gripping elements 5 have a U-shaped part with body 10 provided with wheels 11. Fixing devices 12 are fitted on the legs of the U-shape. The legs of the gripping elements are also provided with supporting points for taking a holding strap 28 which is provided with a lashing device 29. Operating means 24 (not shown in FIG. 3) are fitted on the frame. They comprise a pump lever 25 for producing and removing hydraulic pressure and valves 26, 27 for supplying such pressure to lifting element 14 and tilting devices 17 respectively.

The device described above works as follows:

In the position shown in FIG. 1 the device 1 according to the invention is wheeled under the grand piano 2 and manoeuvred in such a way that the gripping elements 5 are moved around the end face 7 of the grand piano. The gripping elements are then firmly connected to the grand piano by means of holding straps 29. A protective layer 30 is provided in the gripping elements 5 for adapting the gripping elements 5 to the present form of grand piano. The grand piano can then be moved upwards by operating the lifting element 14 by means of pump rod 25 and valve 26, as shown in FIG. 1. In that position the legs 18 and the construction of the pedals of the grand piano can be removed.

Figure 2:
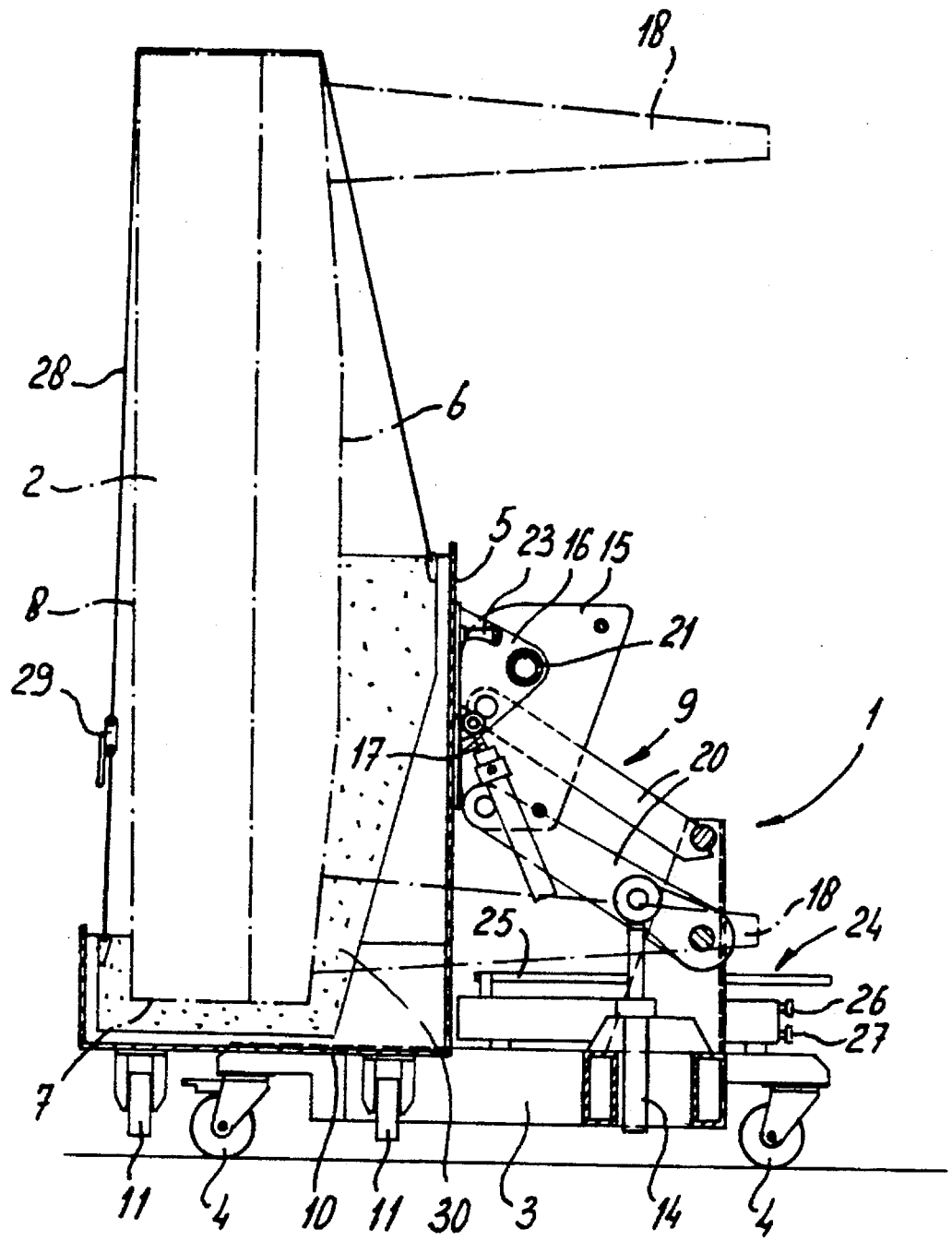
FIG. 2 shows the device according to FIG. 1 in the raised position and tilted position of the grand piano in side view.
Figure 3:
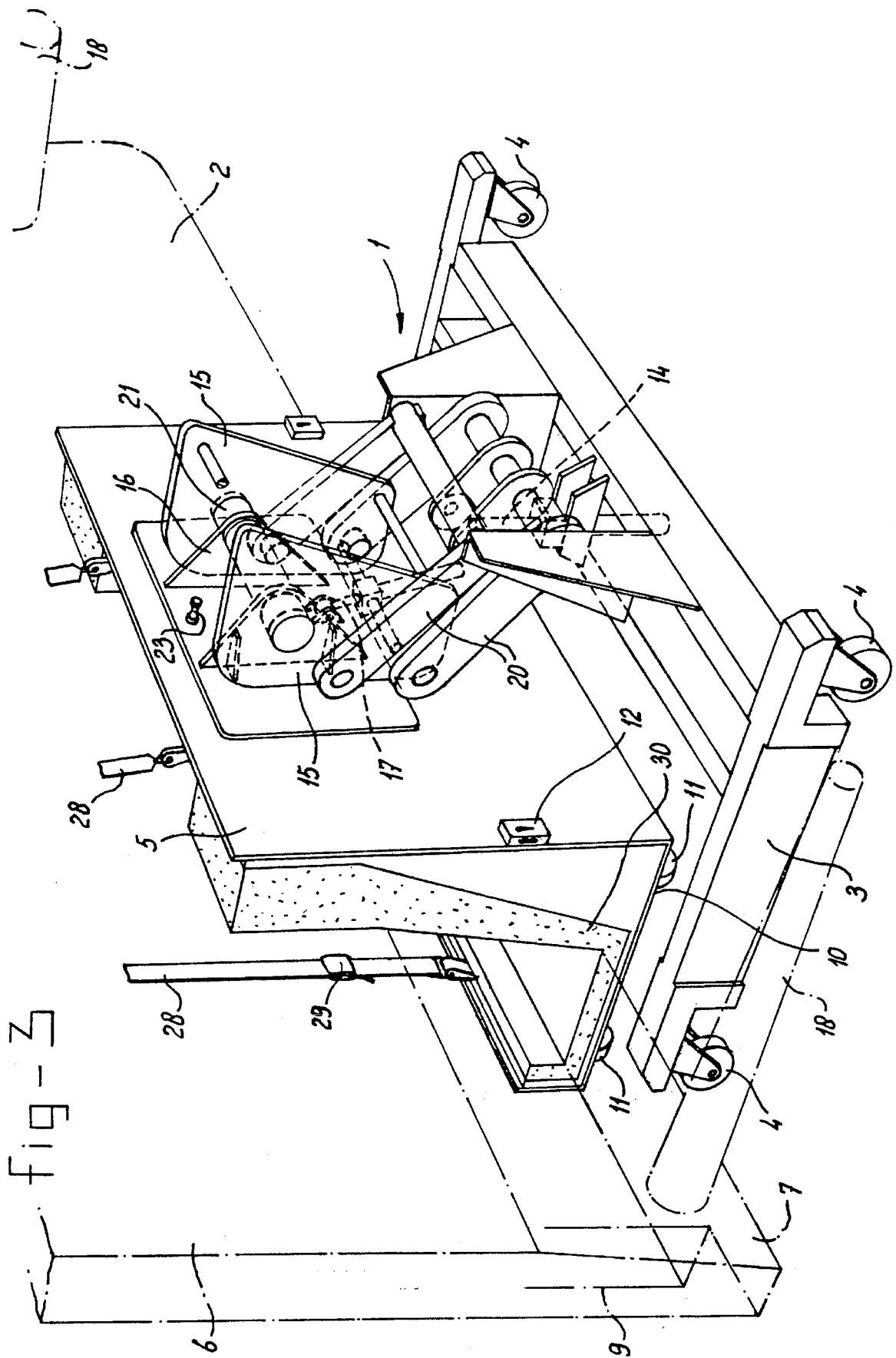
FIG. 3 shows the device according to FIG. 2 in perspective view.
Figure 4:
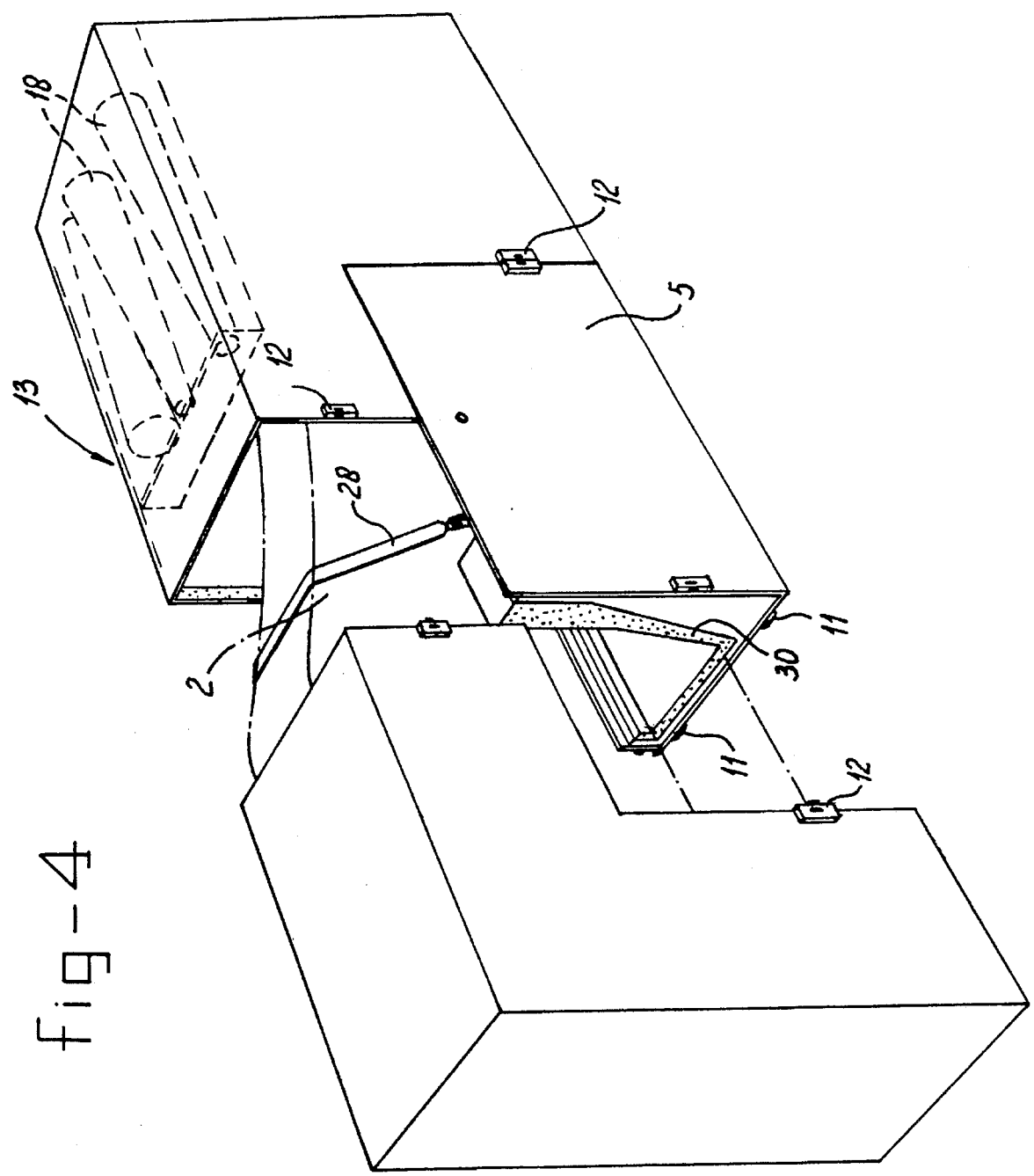
FIG. 4 shows the gripping elements detached from the device and at the moment of being combined with the remaining parts of a container for transportation and storage.

The next step is to turn the gripping elements 5 with the grand piano in them to the vertical position by means of tilting devices 17 operated by pump cylinder 25 and valve 27. Removing pressure in the lifting elements 14 then makes the body 10 rest freely on the floor by means of the wheels 11, as shown in FIGS. 2 and 3. Thereafter, locking device 23 can be operated in such a way that the connection between the coupling part 16 and the gripping elements 5 is broken. In this case any safety devices known in the state of the art can be present to prevent premature detachment of the gripping elements 5 from the device. In this position the wheels 11 are situated between the frame 3 of the device. Either the device or the gripping elements can then be moved. The other parts of the container 13 can be fixed to the gripping elements by means of the fixing devices 12, as shown schematically in FIG. 4. In this way the grand piano can be transported further, and any damage is out of the question.

Although the invention is described above with reference to a preferred embodiment, it must be understood that numerous modifications can be made to it without going beyond the scope of the present invention. For example, it is possible to make the lifting/tilting mechanism in any other way known in the state of the art. The placing in a container can also be carried out in such a way that the grand piano with gripping elements is wheeled into such a container.

We claim:

1. Device for tilting, carrying and transporting a grand piano, comprising: a frame provided with wheels, said frame including means for gripping, means for lifting, and means for tilting the piano, said gripping means including a U-shaped member which comprises a first leg for engaging at least a bottom face of said piano, a second leg for engaging a top face of said piano, and a third leg extending from said first leg to said second leg, and having an inner surface for engaging an end face of said piano which end face extends from said top face to said bottom face, said third leg having an outer surface comprising wheels attached thereto, and said gripping means being detachably connected to the lifting means and the tilting means.

2. Device according to claim 1, wherein the gripping means include fixing means for fastening to a container containing the grand piano.

3. Device according to claim 2, wherein the container has an external boundary, and the gripping means form part of the external boundary of the container.

4. Device according to claim 1, wherein the lifting means and the tilting means comprise a single lifting and tilting unit fitted in the center of the frame.

5. Device according to claim 4, wherein the lifting and tilting unit comprises a parallelogram arm construction which is hingedly fixed at one end to the frame, while lifting elements are fitted between the frame and the construction, said arm being hingedly fixed at the other end to a plate to which a coupling part is hingedly fixed, while tilting devices engage on the coupling part at one side, and on one of the plate and the parallelogram arm construction at the other side.

* * * * *